United States Patent
Mariman et al.

(10) Patent No.: US 7,451,713 B2
(45) Date of Patent: Nov. 18, 2008

(54) SEED DISK FOR A SEED METER

(75) Inventors: Nathan A. Mariman, Mahomet, IL (US); Miles R. Keaton, Sycamore, IL (US); Paul R. Riewerts, Port Byron, IL (US); Michael E. Friestad, Rock Island, IL (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 11/735,116

(22) Filed: Apr. 13, 2007

(65) Prior Publication Data

US 2008/0250993 A1    Oct. 16, 2008

(51) Int. Cl.
*A01C 11/00* (2006.01)

(52) U.S. Cl. ...................................... 111/185; 221/211
(58) Field of Classification Search ................. 111/177, 111/183–185; 221/211, 278, 254, 266, 264
See application file for complete search history.

(56) References Cited

U.S. PATENT DOCUMENTS 6,176,393 B1    1/2001  Luxon ......................... 221/211
6,742,465 B2    6/2004  Crabb et al. ................. 111/185

*Primary Examiner*—Christopher J. Novosad
(74) *Attorney, Agent, or Firm*—Taylor & Aust, P.C.

(57) ABSTRACT

A seed metering system having a housing and a disk rotatably positioned within the housing and having a plurality of holes extending from a first face to a second face thereof, the holes being substantially uniformly placed from one another around the circumference of the disk and each sized to receive a single seed. A pressure differential is maintained between the first and second face of the disk within the housing, the pressure on the first face being higher than the pressure on the second face to urge seeds against the first face of the disk. A plurality of seeds are distributed against the first face of the disk, whereby the pressure differential substantially urges a single seed into a single hole on the disk. A device is provided for releasing the single seeds from the holes on the disk at substantially the same location for sequential distribution of seeds. The plate has a protrusion to interrupt each of the holes, the protrusion having at least a portion thereof substantially in the plane of the intersection between the first face and the holes for preventing seeds to be retained within the holes to promote unimpeded release of the seeds, the area of the protrusion within the plane being selected to permit the maintenance of a pressure differential between the first and second faces of the plate.

23 Claims, 6 Drawing Sheets

SEED DISK FOR A SEED METER

FIELD OF THE INVENTION

The present invention relates to agricultural seeding machines and more particularly to seed metering systems used to meter seeds for placement in a seed trench.

BACKGROUND OF THE INVENTION

An agricultural seeding machine such as a row crop planter or grain drill places seeds at a desired depth within a plurality of parallel seed trenches formed in soil. In the case of a row crop planter, a plurality of row crop units are typically ground driven using wheels, shafts, sprockets, transfer cases, chains and the like. Each row crop has a frame which is movably coupled with a tool bar. The frame may carry a main seed hopper, herbicide hopper and insecticide hopper. If a herbicide and insecticide are used, the metering mechanisms associated with dispensing the granular product into the seed trench are relatively simple. On the other hand, the mechanisms necessary to properly meter the seeds, dispense the seeds at predetermined relative locations within the seed trench are relatively complicated.

The mechanisms associated with metering and placing the seeds generally can be divided into a seed metering system and a seed placement system which are in series communication with each other. The seed metering system receives the seeds in a bulk manner from the seed hopper carried by the frame. Different types of seed metering systems may be used, such as seed plates, finger plates and seed disks. In the case of a seed disk metering system a seed disk is formed with a plurality of seed cells spaced about the periphery of the disk. Seeds are moved into the seed cells with one or more seeds in each seed cell depending upon the size and configuration of the seed cell. A vacuum or positive pressure air differential may be used in conjunction with the seed disk to assist in movement of the seeds into the seed cell. The seeds are singulated and discharged at a predetermined rate to the seed placement system.

The seed placement system may be categorized as a gravity drop system or a power drop system. In the case of the gravity drop system, a seed tube has an inlet end which is positioned below the seed metering system. The singulated seeds from the seed metering system merely drop into the seed tube and fall via gravitational force from a discharge end thereof into the seed trench. Further, the rearward curvature reduces bouncing of the seed as it strikes the bottom of the seed trench.

A seed placement system of the power drop variety generally can be classified as a seed conveyer belt drop, rotary valve drop, chain drop or air drop. These types of seed placement systems provide more consistent placement of the seeds along a predetermined path at a desired spacing.

Certain seed types, notably flat corn seed with insecticide or other treatments, are difficult for vacuum meters to singulate. Pour singulation of difficult seed types is characterized by doubles, skips and bunches of seed carried by the disks. Doubles and skips refer to multiple seeds and no seed respectively in each seed cell. Bunches are multiple seeds carried up by the seed pool accelerators which protrude from the surface of the seed disk. These seed types generally are best planted with a flat seed disk or in combination with a double eliminator. Compared to a celled disk, a flat disk has less favorable seed trajectory into the seed tube, generally requires more vacuum and a production double eliminator, adjustment is difficult.

The double eliminator or singulator generally does an adequate job of ensuring that a single seed is retained within the seed cell and carried by the metering disk to the point where it is dropped into the seed placement system. The seed cell typically consists of an opening or hole through the disk and the pressure differential maintained across the disk holds the seed within the cell. Because of the irregularity of naturally occurring seeds, it is possible for a seed to be stuck into the hole, and therefore prevented from dropping off at the assigned time and location to the seed placement system. Furthermore, it is possible for seeds to split and be placed against the metering disk in a size smaller than normal. This tube may cause the partial seed to be wedged in the hole and resistant to dropping at the assigned location.

What is needed in the art is an agricultural seeding machine having a seed disk that is resistant to seeds being lodged within the holes in the seed disk.

SUMMARY OF THE INVENTION

In one form the invention includes a seed metering system having a housing and a plate positioned within the housing and having a plurality of holes extending from a first face to a second face thereof, the holes being substantially uniformly placed from one another and each size to receive a single seed. A pressure differential is maintained between the first and second face of the plate within the housing, the pressure on the first face being higher than the pressure on the second face to urge seeds against the first face of the plate. That device is provided for distributing a plurality of seeds against the first face of the plate, whereby the pressure differential substantially urges a single seed into a single hole on the plate. A device for releasing the single seeds from the holes on the plate at substantially the same location for sequential distribution of seeds. The plate has a protrusion to interrupt each of the holes, the protrusion having at least a portion thereof substantially in the plane of the intersection between the first face and the holes for preventing seeds to be retained within the holes to promote unimpeded release of the seeds, the area of the protrusion within the plane being selected to permit the maintenance of a pressure differential between the first and second faces of the plate.

The invention, in another form is a plate having a plurality of holes extending from a first face to a second face thereof, the holes being substantially uniformly spaced from one another and each size to receive a single seed. The plate is subjected to a pressure differential between the first and second face, the pressure on the first face being higher than the pressure on the second face to urge a seed into each hole on the first face of the plate. A protrusion extends from the plate to interrupt each of the holes, the protrusion having at least a portion thereof substantially in the plane of the intersection between the first face and the hole for preventing seeds to be retained within the holes to promote unimpeded release of the seeds. The area of the protrusion within the plane is selected to still permit the maintenance of a pressure differential between the first and second faces of the plate.

DETAILED DESCRIPTION OF THE INVENTION

Figure 1:
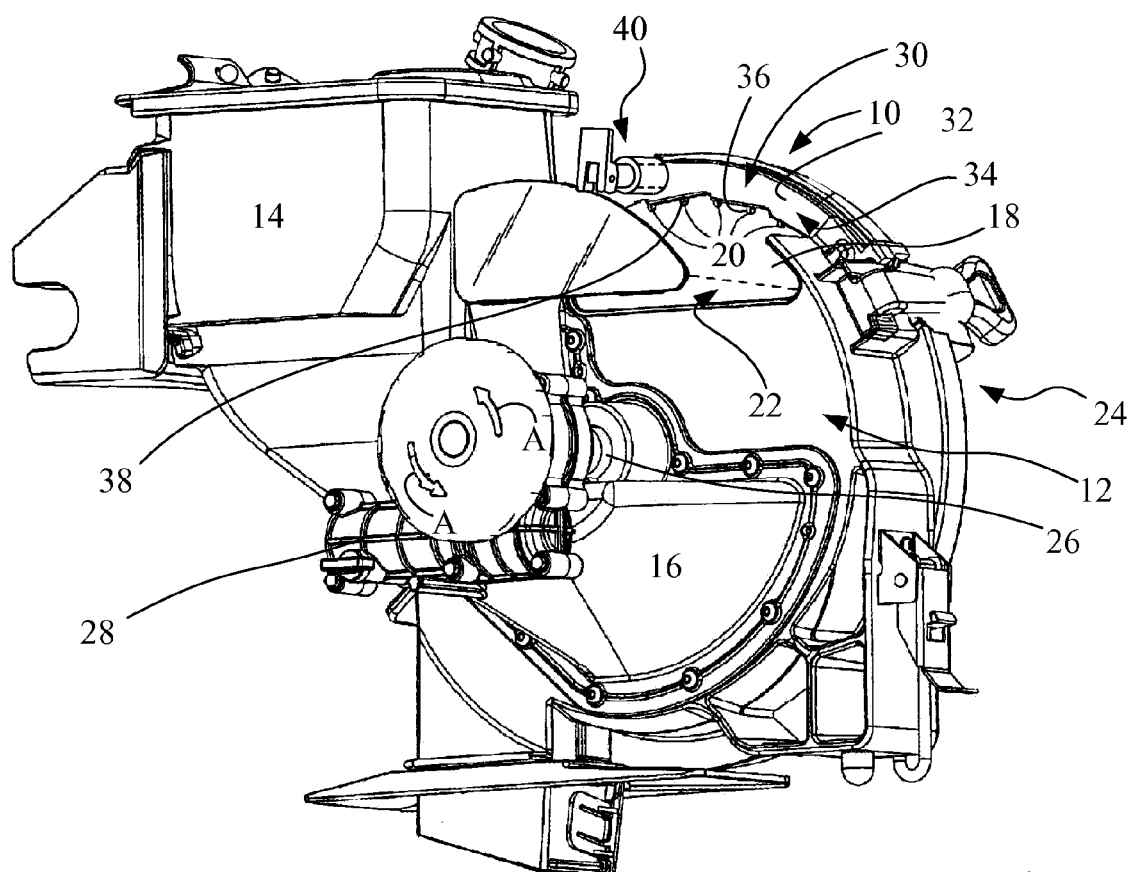
FIG. 1 is a perspective view of a seed metering unit incorporating a seed disk embodying the present invention.

Referring to FIG. 1, a seed meter, generally indicated by reference character 10, is incorporated in a seeding machine (not shown). The seeding machine has many additional features such as a main hopper or seed air pump to deliver seed to individual seed meters of which unit 10 is one of multiple units. Details of such an overall system may be found in U.S. Pat. No. 6,758,153, of common assignment with this invention, the disclosure of which is hereby incorporated in its entirety. The seed meter 10 includes a housing 12 and a seed hopper 14 which receives an appropriate supply of seeds from a main hopper (not shown). Seed hopper 14 delivers seeds to a chamber in a housing 16 at the lower portion of housing 12. A seed disk 18, in plate form, is journaled in housing 12 and has a seed side 22 exposed to chamber 16 and a lower pressure side 24 exposed to a vacuum source for maintaining a pressure differential across seed disk 18. Seed disk 18 has a plurality of seed cells 20 positioned in a circular fashion around seed disk 18. Seed cells 20 may take many different forms, but in the illustrated form they are holes extending through seed disk 18 to connect the seed side 22 to the lower pressure side 24. It should be understood by those skilled in the art that the pressure levels of sides 22 and 24 may be reversed.

Seed disk 18 is journaled on shaft 26 which is driven by an appropriate motor 28 through a gear mechanism (not shown) to turn the seed disk 18 in the direction of arrows A. The seeds that have accumulated against the bottom of seed disk 18 then find their way to the seed cells by virtue of the pressure differential across the seed disk. As the disk turns in a counterclockwise fashion, as shown in FIG. 1, the seeds that are in the seed cells are retained one at a time. The rotation of the disk takes the individual seeds to a segment (not shown) higher than the point at which the seed hopper 14 delivers seed to disk 18 where the pressure differential is locally interrupted so that the seed may be discharged into an appropriate planting mechanism.

Because of the variability of the shape and size of seeds, double seeds may be retained within the seed cells. To eliminate this condition, a singulator, generally indicated by reference character 30, is provided. Although this component may be referred to as a singulator it is also described in the art as a "double eliminator". The singulator 30 includes an arm 32 pivotally mounted to housing at screw 34 and positioned adjacent the path of the seed cells 20. The arm 32 has a plurality of ramps 36 and 38 to knock off multiple seeds that have been somehow retained or lodged in the seed cells 20. Arm 32 is generally arcuate in shape and has an adjustment mechanism, generally indicated by reference character 40, at an end radially spaced from pivot screw 34. The purpose of mechanism 40 is to cause the singulator 30 to pivot about pivot screw 34 and accommodate seeds of different varieties and grades to provide the most effective elimination of multiple seeds.

Figure 2:
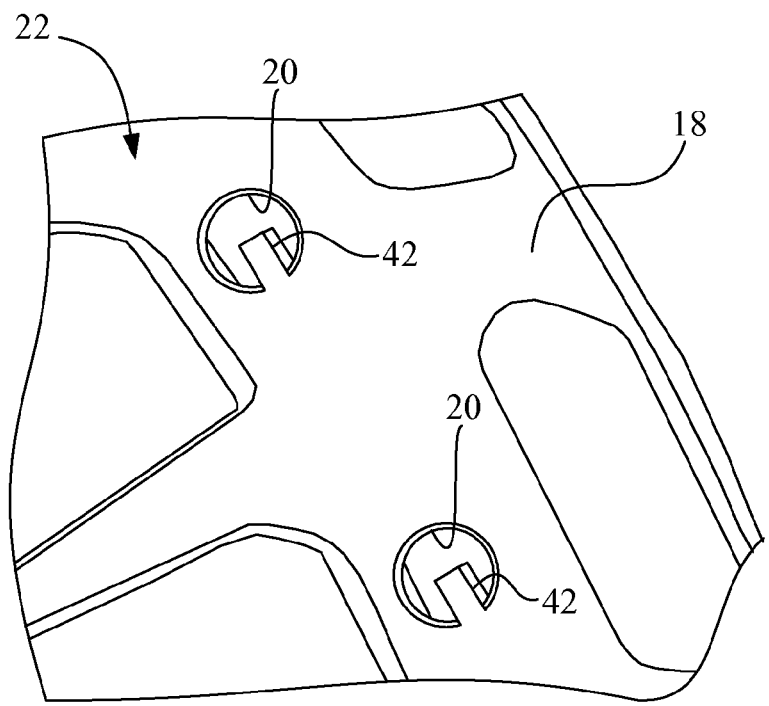
FIG. 2 is an enlarged fragmentary view of the seed disk of FIG. 1 showing one embodiment of the present invention.

Referring now to FIG. 2, the seed disk 18 has a plurality of holes 20, uniformly spaced from one another around the circumference of disk 18. The holes are modified in accordance with the present invention to have a protrusion 42 extending from the circumference of hole 20 towards the center to interrupt the otherwise uniform periphery 21 of hole 20. As shown in FIG. 2, the protrusion 42 is integral with the disk 18. However, it may be provided as a separate element affixed to disk 18, as would be apparent to those skilled in the art. The size of protrusion 42 is selected so that it prevents seeds of smaller size and even half seeds from lodging in the hole 20 but is small enough in area blocking air flow to still permit a pressure differential to be maintained across disk 18 to maintain seeds at holes 20.

Figure 3:
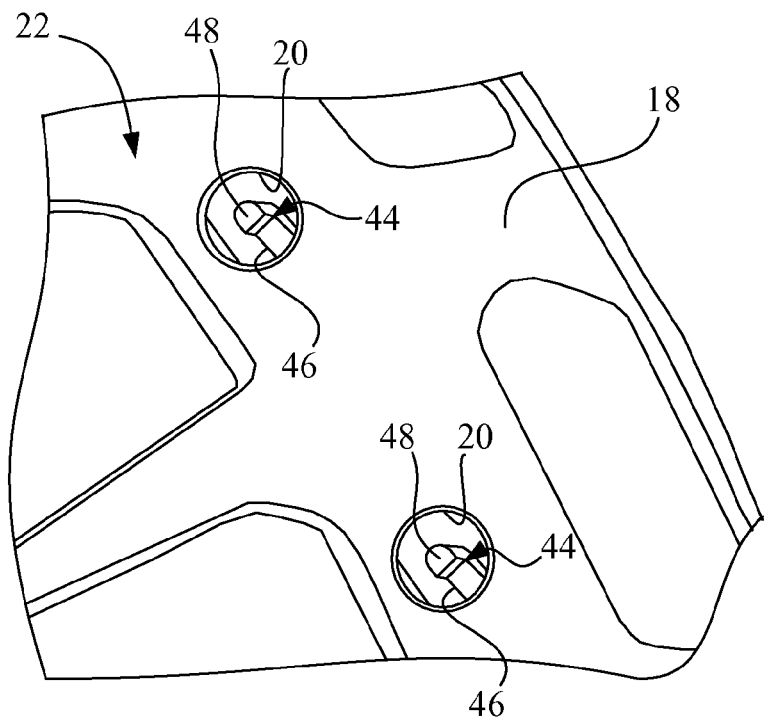
FIG. 3 is an enlarged fragmentary view of the seed disk of FIG. 1 showing an alternative embodiment of the invention.

FIG. 3 shows an alternative embodiment in which a protrusion 44 extends radially inward from the circumference 21 of hole 20. For convenience in discussing the invention, disk 18 will be referred to throughout by the reference character 18, while the alternative embodiments of protrusions will carry their own designations. Protrusion 44 has a portion 46 extending from the opposite side 24 of disk 18 which, as shown, has lower pressure on that side. Arm 46 extends to a central protrusion 48 extending upward to approximately where the plane of side 22 of disk 18 intersects hole 20. Again, the central protrusion 48 is selected in size to prevent smaller size seeds and, even half seeds from lodging in hole 20 but small enough in area blocking air flow to still permit maintenance of a pressure differential across disk 18 to maintain seeds at holes 20.

Figure 4:
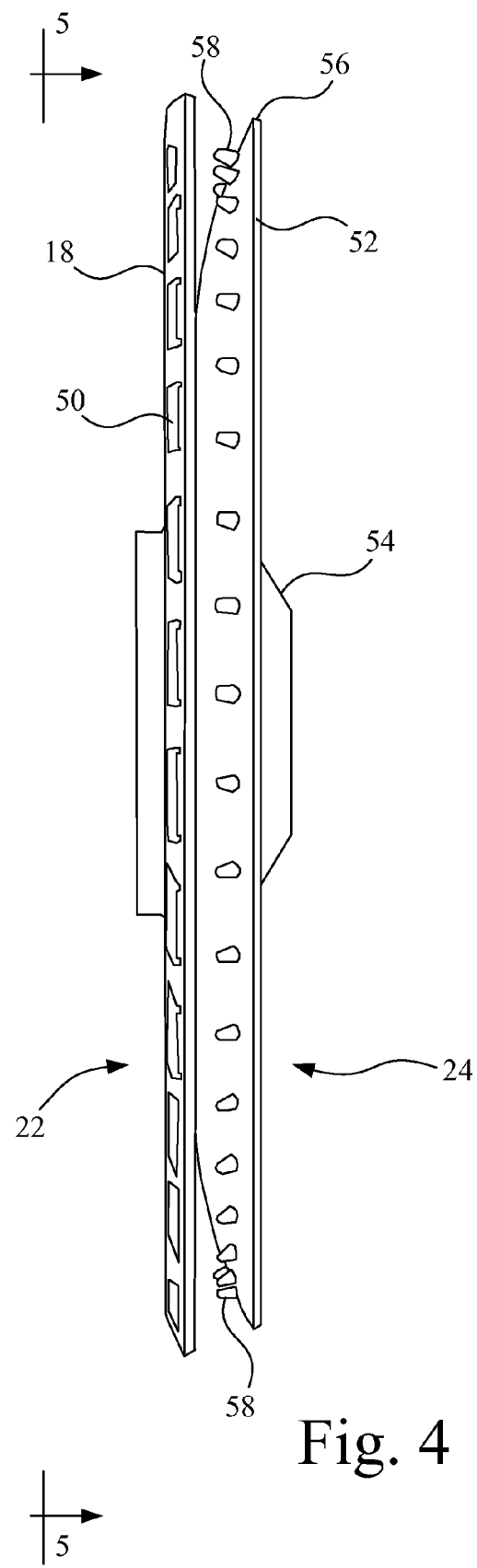
FIG. 4 is a side view of a seed disk of FIG. 1 showing still another embodiment of the present invention.
Figure 5:
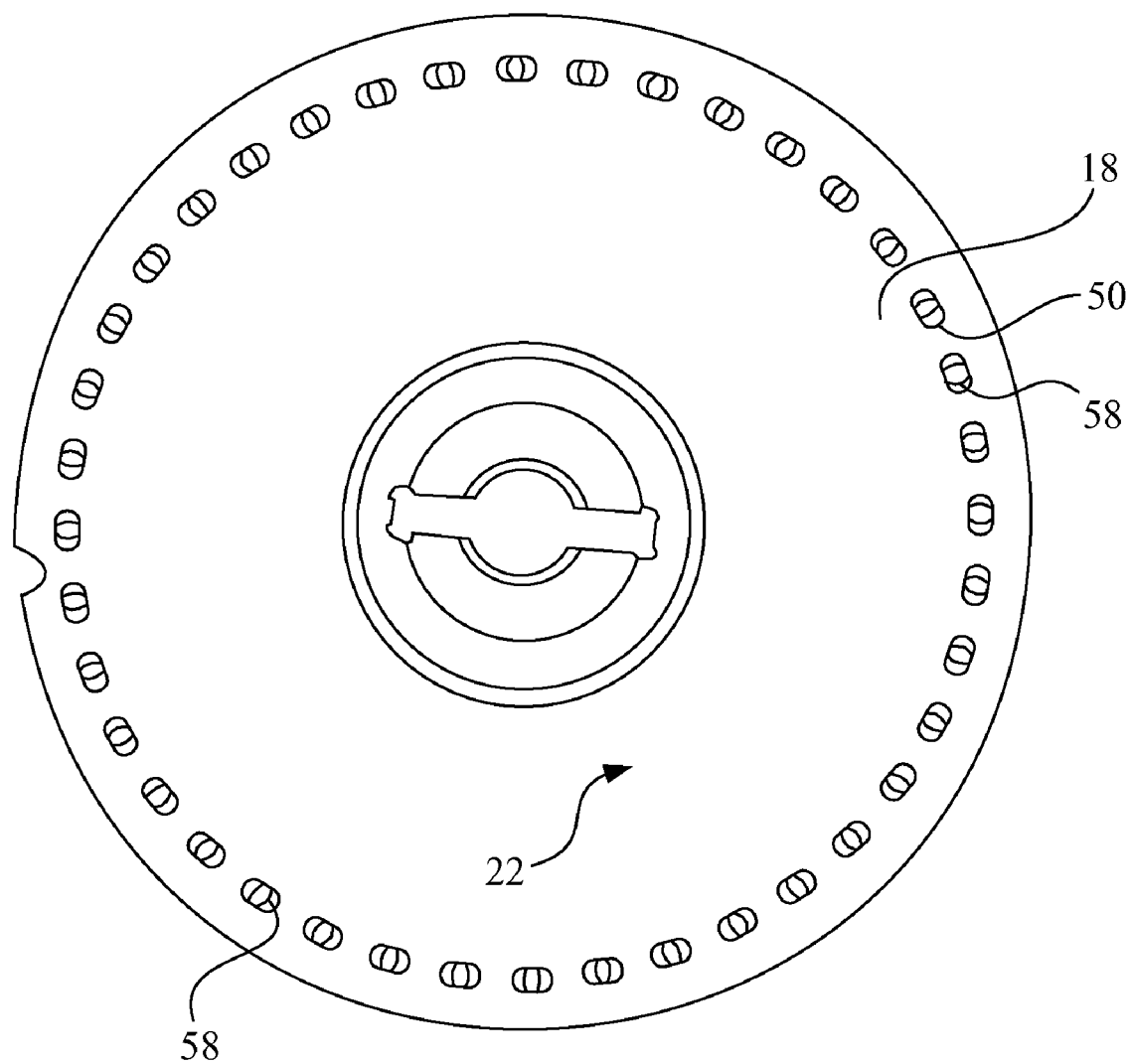
FIG. 5 is an end view of the seed disk of FIG. 4 taken on lines 5-5 of FIG. 4.

The protrusions shown in FIGS. 2 and 3 are fixed relative to the disk 18. The protrusions found in FIGS. 4 to 7 are flexible as described below. Referring particularly to FIG. 4, the seed disk 18 has a plurality of seed cells, herein shown as holes 50 of an oval configuration. The holes 50 are spaced uniformly relative to one another around the circumference of disk 18 and are sized to receive the appropriate seed desired to be planted. The seed side 22 of disk 18 receives seeds and on the vacuum side 24 there is a flexible disk 52 mounted to the seed disk 18 adjacent a central hub 54 and free to flex at the radially outer circumference 56 of flexible disk 52. A plurality of protrusions 58 are positioned on disk 52 to project toward the seed side 22 of disk 18 and are aligned to project through holes 50, as shown in FIG. 5. Disk 52 may be formed from material that provides the flexibility to allow protrusions to be displaced relative to holes 50.

Figure 6:
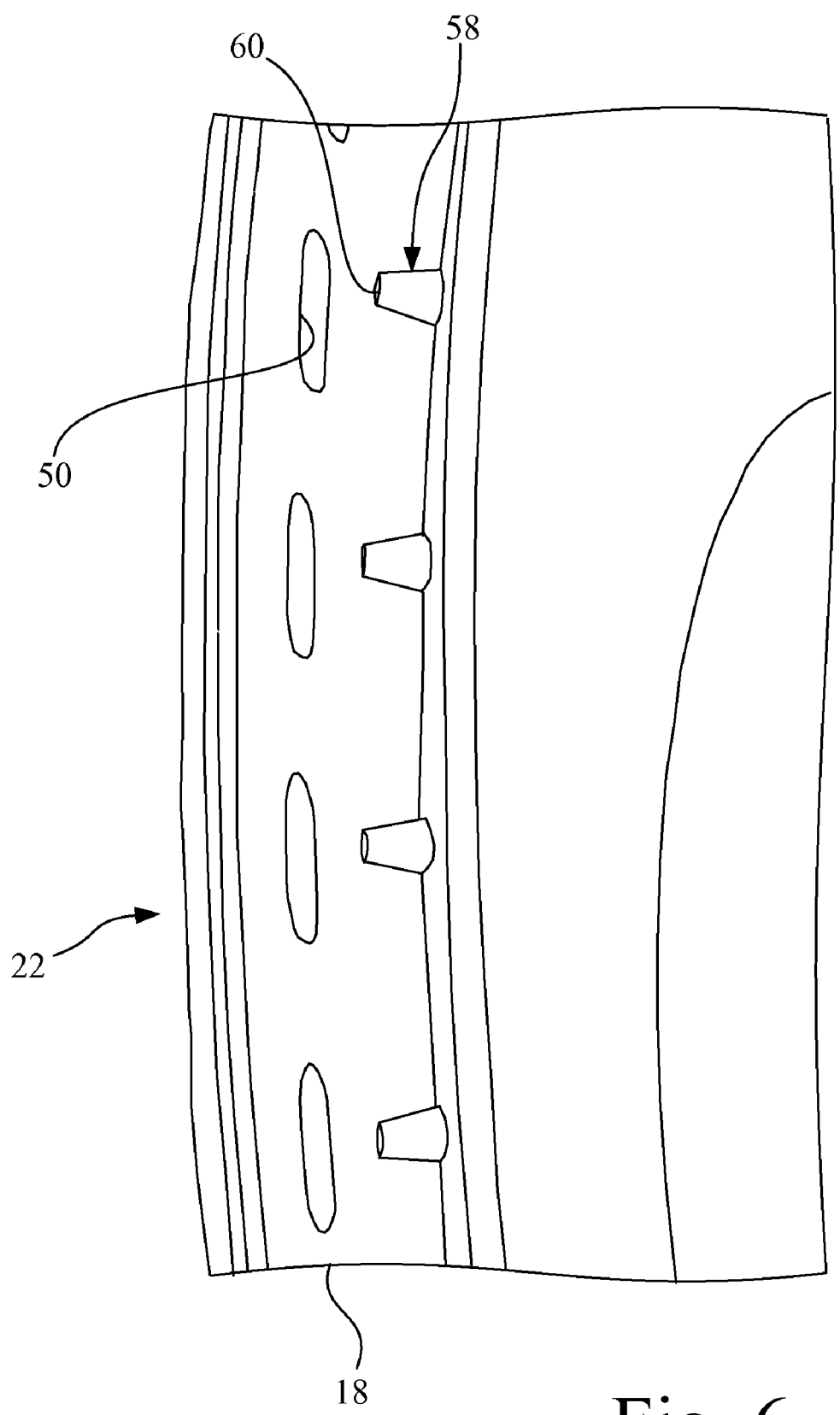
FIG. 6 is an enlarged fragmentary view of the seed disk of FIG. 4.

As shown particularly in FIG. 6, protrusions 58 are frusto-conical in form and have a crown 60 that approximately aligns with the plane of the intersection between holes 50 and the seed side 22 of seed disk 18 when disk 52 abuts the vacuum side of disk 18. However, in normal operation the protrusions 58 are in the position illustrated in FIGS. 4 and 6.

Figure 7:
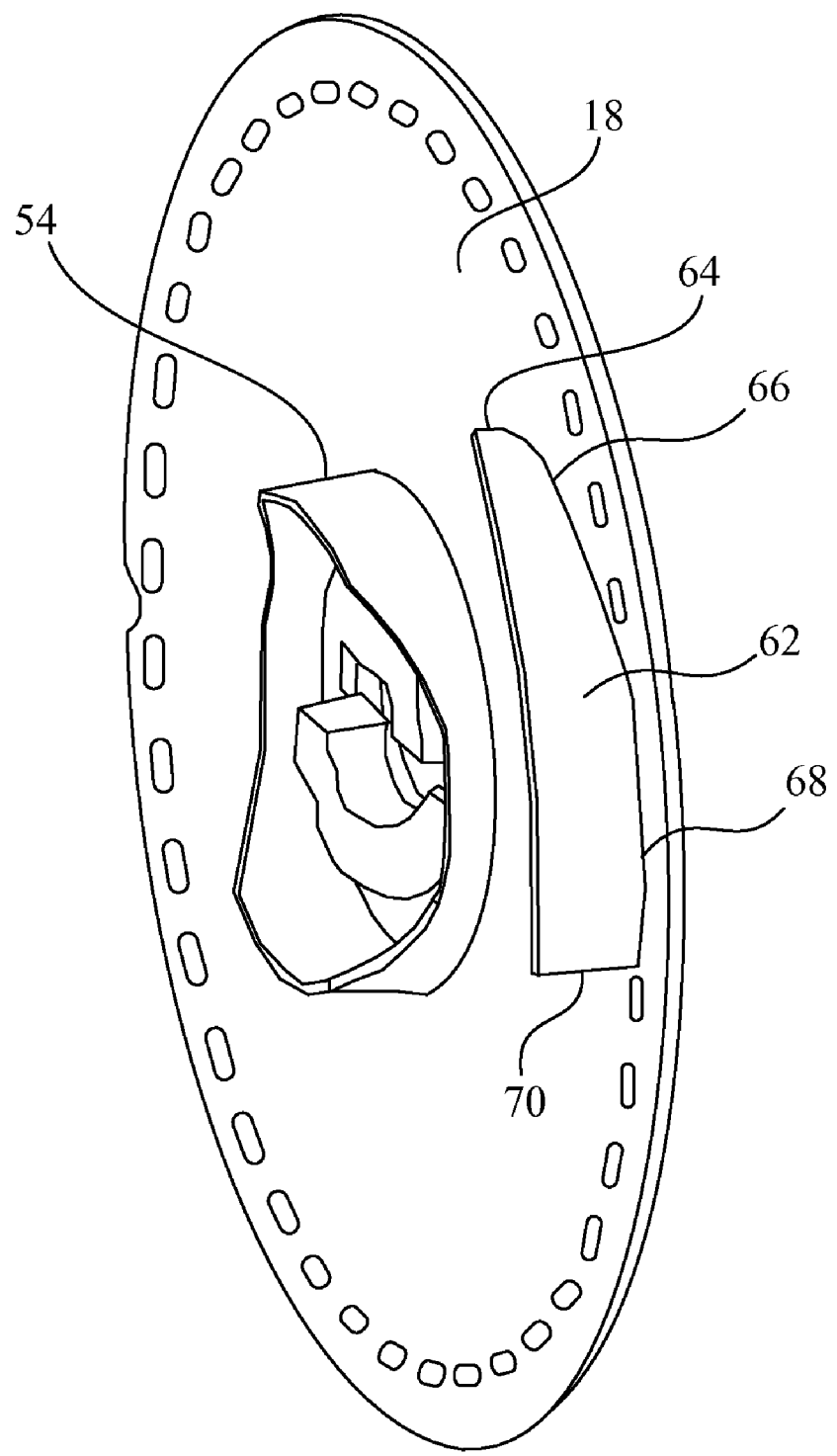
FIG. 7 is a view of the seed disk of FIG. 4.

As shown in FIG. 7, the seed disk 18 is attached to the hub 54 to provide rotational support and a ramp 62 is appropriately affixed to the housing 12 on the vacuum side 24 of disk 18. The details of how the ramp is secured are not shown to simplify the discussion of the present invention. Ramp 62 has a leading edge 64 connected to an inclined surface 66, leading to a crown 68 and a trailing edge 70. The ramp 62 acts on the flexible disk 52 to urge it towards seed disk 18 and thus have the protrusions 58 extend into holes 50. The ramp 62 is positioned adjacent the segment in the seed metering device 10 where the pressure differential is locally interrupted so that the seeds may be discharged into an appropriate planting mechanism.

In operation, the seeds accumulate against the face 22 of disk 18 and the singulator 30 acts to substantially eliminate all but one seed. The protrusions act to keep the single seeds from lodging in the seed cells in the event the seeds are smaller than normal size or half seeds. This effectively prevents any impediment to the free dropping of seeds at the appropriate segment in the seed metering device 10. In the embodiment shown in FIGS. 4-7, the protrusions are maintained away from the seed cells and brought into play at the point where the seeds are desired to be discharged into a planting mechanism. This provides the advantage of a maximum surface area exposed to the pressure differential for consistent holding of the seed in the seed cell. At the same time, the protrusions 58 are displaced into the holes 50 to dislodge and undersize seeds or half seeds that may have become stuck in the holes 50. It should be noted that the inclined surface 66 of ramp 62 displaces the protrusions 58 in such a manner that seeds are dropped from holes 50 instead of being propelled from the holes. This enhances the accuracy of the seed placement in the field.

Having described the preferred embodiment, it will become apparent that various modifications can be made without departing from the scope of the invention as defined in the accompanying claims.

The invention claimed is:

1. A seed metering system comprising:
   a housing;
   a plate positioned within said housing and having a plurality of holes extending from a first face to a second face thereof, said holes being substantially uniformly spaced from one another and each sized to receive a single seed;
   a device for maintaining a pressure differential between the said first and second face of said plate within said housing, the pressure on said first face being higher than the pressure on said second face to urge seeds against said first face of said plate;
   a device for distributing a plurality of seeds against the first face of said plate, whereby the pressure differential substantially urges a single seed into a single hole on said plate; and
   a device for releasing the single seeds from the holes on said plate at substantially the same location for sequential distribution of said seeds, said plate having a protrusion to interrupt each of said holes at least at said release location, said protrusion having at least a portion thereof approximately in the plane of the intersection between said first face and said holes for preventing seeds to be retained within the holes to promote unimpeded release of the seeds, the flow blocking area of said protrusion within said plane being selected to permit the maintenance of a pressure differential between the first and second faces of said plate.

2. The seed metering system as claimed in claim 1, wherein there is relative movement between said plate and said housing to the said release location for distribution of said seeds.

3. The seed metering system as claimed in claim 2, wherein said relative movement is rotary.

4. The seed metering system as claimed in claim 3, wherein said seeds are applied to said plate at a point that is lower than the location at which said seeds are released from said plate.

5. The seed metering system as claimed in claim 1, wherein the device for releasing the single seeds releases the pressure differential at said release location.

6. The seed metering system as claimed in claim 5, wherein said plate is a rotatable disk and said pressure differential device maintains a pressure differential in a segment around said disk except for said release location.

7. The seed metering system as claimed in claim 1, wherein said protrusions are displaceable.

8. The seed metering system as claimed in claim 1, wherein said protrusions are displaceable out of the plane at the intersection between said holes and said first face of said plate.

9. The seed metering system as claimed in claim 8, wherein said protrusions are displaceable toward said first face at said release location.

10. The seed metering system as claimed in claim 9, further comprising a device for displacing said protrusions at least to approximately said plane at said release location.

11. The seed metering system as claimed in claim 10, wherein said plate is a disk rotatable within said housing and said device for displacing said protrusions to said plane is a ramp positioned at said release location and sequentially acting on said protrusions to urge them toward said first face.

12. The seed metering system as claimed in claim 1, wherein said protrusions comprise a projection extending from the circumference of each said hole inward towards the center thereof, one face of said protrusion being in said plane.

13. The seed metering system as claimed in claim 1, wherein said protrusion comprises an portion fixed to said plate and extending towards the center of said hole in a location spaced from said plane and terminating in a protrusion substantially positioned within said plane.

14. A seed metering device comprising:
   a plate having a plurality of holes extending from a first face to a second face thereof, said holes being substantially uniformly spaced from one another and each sized to receive a single seed;
   said plate being subjected to a pressure differential between said first and second face, the pressure on the first face being higher than the pressure on said second face to urge a seed into each hole on the first face of said plate; and
   a protrusion extending from said plate to interrupt each of said holes, said protrusion having at least a portion thereof substantially in the plane of the intersection between said first face and said holes for preventing seeds to be retained within the holes to promote unimpeded release of the seeds, the flow blocking area of said protrusion within said plane being selected to permit the maintenance of a pressure differential between the first and second faces of said plate.

15. The seed metering device as claimed in claim 14, wherein said protrusion is displaceable.

16. The seed metering device as claimed in claim 14, wherein said protrusion is displaceable out of said plane.

17. The seed metering device as claimed in claim 16, wherein said protrusion is displaceable to urge a seed out of said hole toward the first face of said plate.

18. The seed metering device as claimed in claim 17, wherein said protrusion is urged out of said plane only when said seed is to be released from said plate.

19. The seed metering device as claimed in claim 14, wherein said plate is a disk and said holes are circumferentially placed apart from one another at a given radial distance from said center.

20. The seed metering device as claimed in claim 19, wherein said protrusions extend from the periphery of said hole toward said center.

21. The seed metering device as claimed in claim 20, wherein said holes are circular in cross-section and said protrusions extend radially inward from the circumference of said hole.

22. The seed metering device as claimed in claim 19, wherein said protrusions extend from a flexible disk secured to the central portion of the disk containing said holes, said protrusions being aligned with said holes.

23. The seed metering device as claimed in claim 22, wherein said protrusions are frustoconical in form having a crown that lies approximately in said plane when said flexible disk abuts the disk containing said holes.

* * * * *